(12) United States Patent
Okawa et al.

(10) Patent No.: US 9,804,049 B2
(45) Date of Patent: Oct. 31, 2017

(54) PRESSURE DETECTION DEVICE AND INTAKE PRESSURE MEASUREMENT APPARATUS USING THE SAME

(71) Applicant: ALPS ELECTRIC CO., LTD., Ota-ku, Tokyo (JP)

(72) Inventors: Hisanobu Okawa, Tokyo (JP); Yasuhiro Suda, Tokyo (JP); Hiroshi Ishida, Tokyo (JP); Hideki Kamimura, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 267 days.

(21) Appl. No.: 14/474,788

(22) Filed: Sep. 2, 2014

(65) Prior Publication Data
US 2015/0075266 A1 Mar. 19, 2015

(30) Foreign Application Priority Data
Sep. 18, 2013 (JP) ................................. 2013-192829

(51) Int. Cl.
*G01M 15/04* (2006.01)
*G01L 19/14* (2006.01)
*G01L 19/06* (2006.01)

(52) U.S. Cl.
CPC ........ *G01L 19/145* (2013.01); *G01L 19/0654* (2013.01)

(58) Field of Classification Search
USPC ........................................ 73/114.33, 114.37
See application file for complete search history.

(56) References Cited

U.S. PATENT DOCUMENTS

| | | | | |
|---|---|---|---|---|
| 5,629,486 | A * | 5/1997 | Viduya | G01L 9/0051 73/720 |
| 6,070,469 | A * | 6/2000 | Taniguchi | G01L 19/0038 73/715 |
| 6,131,467 | A * | 10/2000 | Miyano | G01L 19/0084 73/756 |
| 6,487,911 | B1 * | 12/2002 | Frackelton | G01L 9/0075 73/714 |
| 6,732,590 | B1 * | 5/2004 | Gottlieb | G01L 19/147 73/754 |
| 6,769,308 | B1 * | 8/2004 | Pitzer | B60C 23/0408 73/700 |
| D689,390 | S * | 9/2013 | Okawa | D10/85 |
| D689,391 | S * | 9/2013 | Okawa | D10/85 |

(Continued)

FOREIGN PATENT DOCUMENTS

JP 2000-162075 6/2000
JP 2004-361308 12/2004

*Primary Examiner* — Eric S McCall
(74) *Attorney, Agent, or Firm* — Hunton & Williams LLP

(57) ABSTRACT

In a pressure detection device which is provided in an intake pressure measurement apparatus, a detection space surrounded by an outer wall portion is formed in a housing, and an inner wall portion is formed integrally in the detection space such that both end portions are connected to the outer wall portion. The inner wall portion has a cylindrical shape, and a sensor storage portion is formed between the inner wall portion and the outer wall portion. In the sensor storage portion, a pressure sensor is disposed in a region with the least influence of thermal stress at a position closer to the inner wall portion than the outer wall portion.

11 Claims, 7 Drawing Sheets

(56) References Cited

U.S. PATENT DOCUMENTS

| | | | |
|---|---|---|---|
| 2003/0213307 A1* | 11/2003 | Kaneko | G01L 19/0061 73/720 |
| 2004/0206186 A1* | 10/2004 | Clark | G01L 23/222 73/753 |
| 2007/0056378 A1* | 3/2007 | Ishii | G01L 9/0033 73/729.1 |
| 2011/0088460 A1* | 4/2011 | Mueller | G01L 23/10 73/114.19 |
| 2011/0192358 A1* | 8/2011 | Ramond | G01L 23/10 123/2 |
| 2012/0260738 A1* | 10/2012 | Thomas | G01L 19/14 73/708 |
| 2014/0076057 A1* | 3/2014 | Slakhorst | G01L 19/145 73/715 |
| 2016/0023523 A1* | 1/2016 | Palacios | B60C 23/0496 73/146.8 |

* cited by examiner

PRESSURE DETECTION DEVICE AND INTAKE PRESSURE MEASUREMENT APPARATUS USING THE SAME

CLAIM OF PRIORITY

This application contains subject matter related to and claims the benefit of Japanese Patent Application No. 2013-192829 filed on Sep. 18, 2013, the entire contents of which is incorporated herein by reference.

BACKGROUND OF THE DISCLOSURE

1. Field of the Disclosure

The present disclosure relates to a pressure detection device, and an intake pressure measurement apparatus which measures an intake pressure of an internal combustion engine using the pressure detection device.

2. Description of the Related Art

Japanese Unexamined Patent Application Publication No. 2000-162075 discloses an intake pressure measurement apparatus which measures the pressure of an intake channel of an internal combustion engine.

The intake pressure measurement apparatus has two chambers which are partitioned to have a concave shape in a main housing. A pressure sensor chip which is a pressure detection element is fixed in one chamber, and the pressure sensor chip is covered with protection gel. An IC package which is a signal processing element is fixed in the other chamber.

A cover which covers the two chambers of the main housing is provided, and a pressure introduction pipe which introduces the pressure of the intake channel of the internal combustion engine is formed integrally in the cover. The pressure introduction pipe faces the pressure sensor chip, and the pressure of the intake channel is detected by the pressure sensor chip.

As described in Japanese Unexamined Patent Application Publication No. 2000-162075, in this kind of intake pressure measurement apparatus, since a metallic lead frame is buried in the main housing, thermal strain is likely to be applied to the pressure sensor chip due to the difference in thermal expansion coefficient between the lead frame and the main housing.

When the main housing is used in combination with a cover which is a casing, mechanical stress, such as fastening force or vibration, is often applied to the main housing.

In the structure described in FIG. 2 of Japanese Unexamined Patent Application Publication No. 2000-162075, the pressure sensor chip is disposed close to the outer wall side in one chamber of the main housing. For this reason, strain which is generated in the main housing due to thermal stress or mechanical stress is likely to directly act on the pressure sensor chip. Strain which is applied to the pressure sensor chip becomes disturbance other than change in pressure, making it impossible to accurately measure the intake pressure.

These and other drawbacks exist.

SUMMARY OF THE DISCLOSURE

Embodiments of the disclosure provide a pressure detection device having a structure in which strain due to thermal stress or the like is unlikely to act on a pressure sensor provided in a housing and an intake pressure measurement apparatus using the pressure detection device.

According to an example embodiment, a pressure detection device has a pressure sensor held in a housing, in which an outer wall portion surrounding a detection space and an inner wall portion inside the detection space are formed integrally in the housing, the inner wall portion has both end portions connected to the outer wall portion, and the pressure sensor is fixed at a position closer to the inner surface of the inner wall portion than the inner surface of the outer wall portion in the detection space.

In the pressure detection device, the outer wall portion and the inner wall portion crossing the inside of the outer wall portion are formed integrally in the housing, and the pressure sensor is disposed at a position close to the inner wall portion. With this reinforcing structure, strain which is generated in the housing due to thermal stress or the like is unlikely to directly act on the pressure sensor.

The inner wall portion may have a curved shape, and the pressure sensor may be disposed close to the inner surface on a concave side of the inner wall portion.

For example, the outer wall portion may have a cylindrical shape, and the inner wall portion has an arc shape constituting a part of the cylinder. Also, the inner wall portion may be formed in an angle range equal to or greater than approximately 180 degrees.

If the inner wall portion has a curved shape, and a cylindrical shape in an angle range equal to or greater than approximately 180 degrees, strain acting on the housing is dispersed by the inner wall portion, and strain is unlikely to reach the pressure sensor close to the inner wall portion.

The inner wall portion may have a shape having a linear portion and a corner portion, and the pressure sensor may be fixed inside the corner portion.

In various example embodiments, on a center line O passing through the inner surface of the inner wall portion, to which the pressure sensor is closest, and the center of the pressure sensor, the ratio (L2/L1) of the distance L2 from the center of the pressure sensor to the inner surface of the inner wall portion and the distance L1 from the inner surface of the inner wall portion and the inner surface of the outer wall portion with the pressure sensor sandwiched therebetween is equal to or less than approximately ⅓.

The housing may be formed of a synthetic resin material, a terminal strip may be buried in the housing, and the pressure sensor may be disposed at a position not overlapping the terminal strip.

The pressure sensor may be disposed in the center portion of the detection space surrounded by the outer wall portion.

According to an example embodiment, an intake pressure measurement apparatus has a casing configured to hold the pressure detection device, and an intake hole configured to introduce an intake pressure of an internal combustion engine to the detection space is formed in the casing.

According to the example embodiments, even if thermal stress based on the difference in thermal expansion coefficient between the housing and the terminal strip is applied, with the reinforcing structure by the outer wall portion and the inner wall portion, it is possible to prevent strain generated in the housing from directly acting on the pressure sensor. For this reason, it is possible to prevent a phenomenon in which a large error occurs in measuring a pressure value due to strain of the housing.

DETAILED DESCRIPTION OF THE DISCLOSURE

The following description is intended to convey a thorough understanding of the embodiments described by providing a number of specific embodiments and details involving a pressure detection device and intake pressure measurement apparatus. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
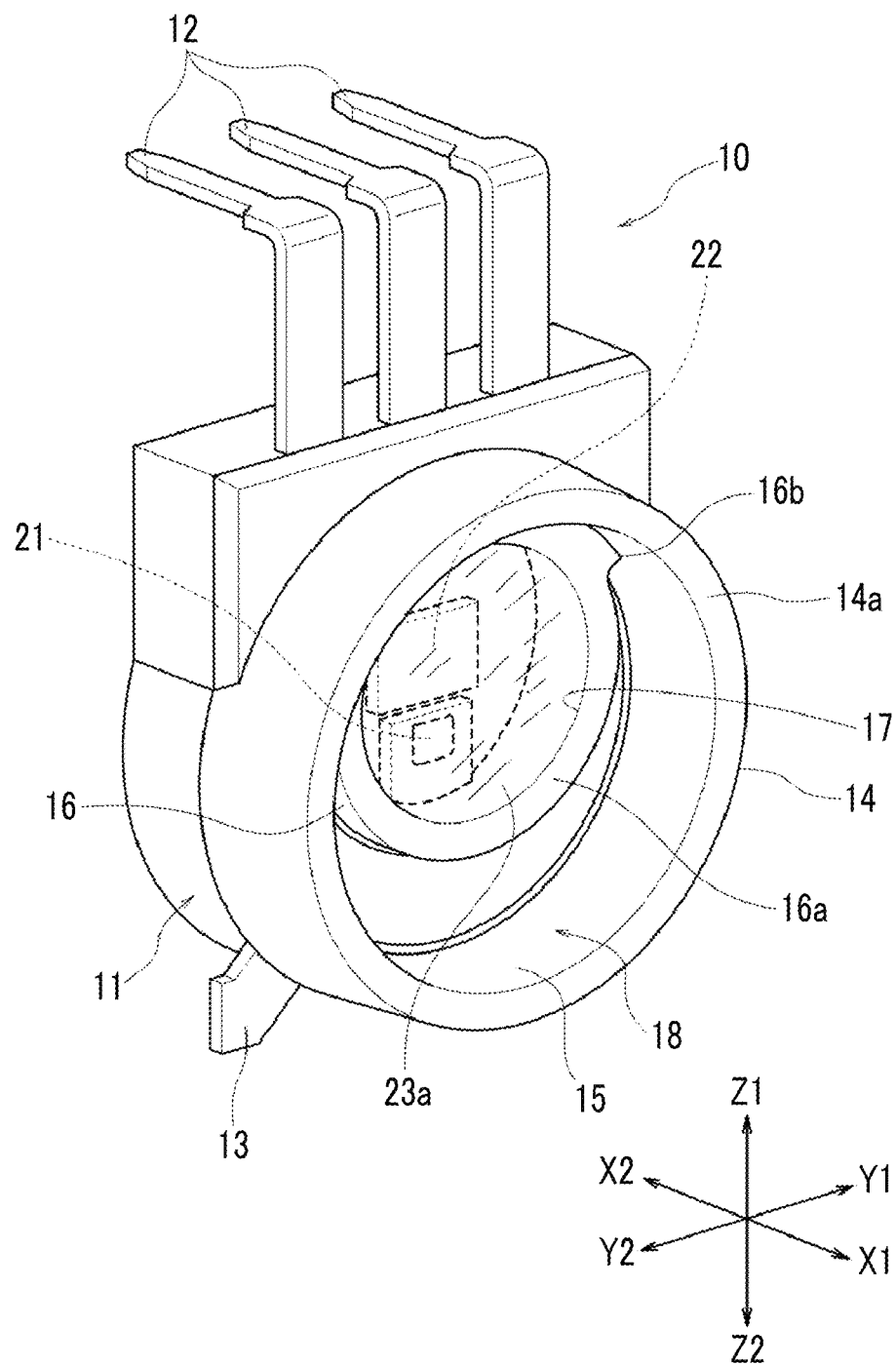
FIG. 1 is a perspective view of a pressure detection device according to a first embodiment of the invention.
Figure 2:
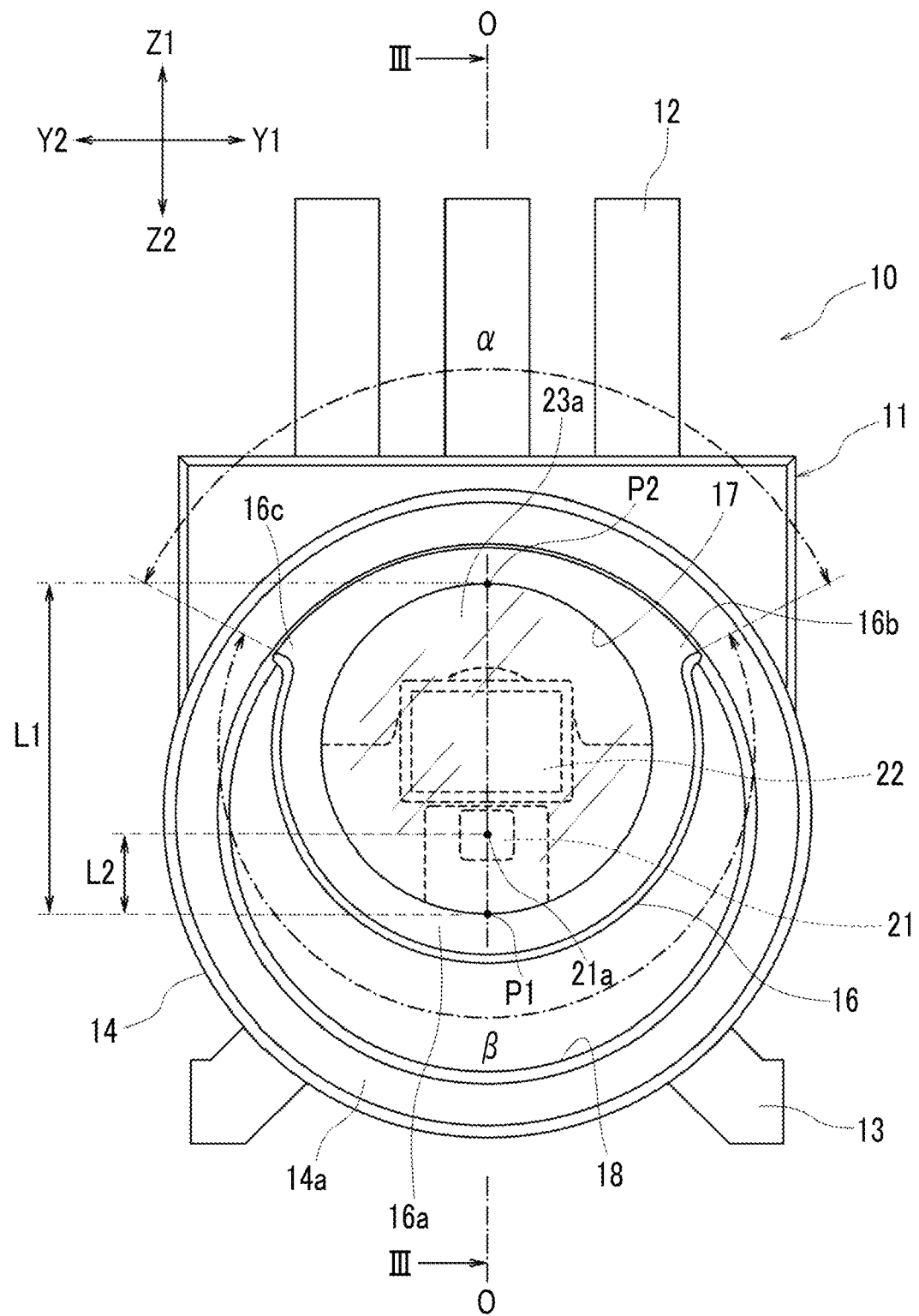
FIG. 2 is a front view of the pressure detection device of the first embodiment.
Figure 3:
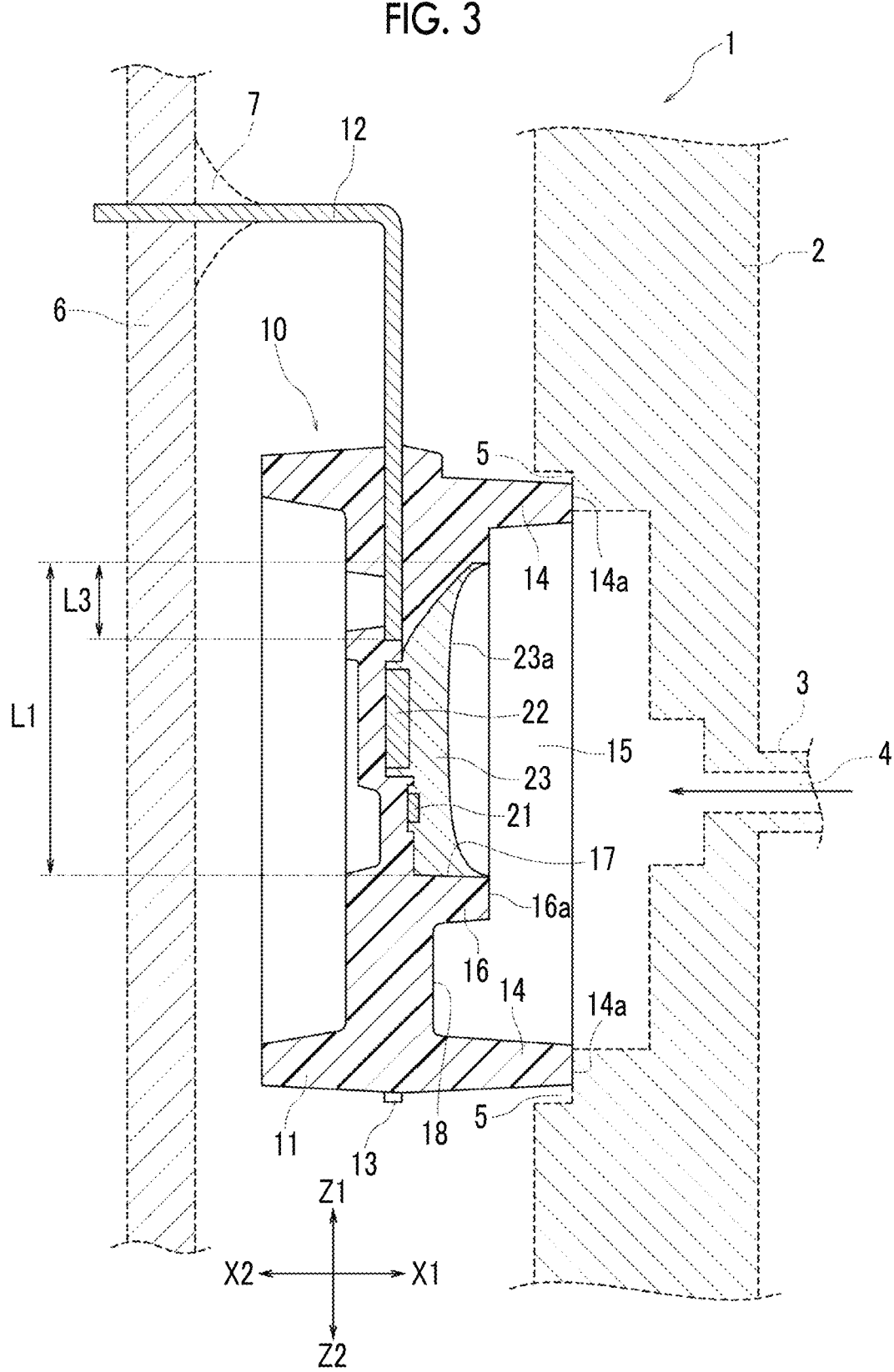
FIG. 3 is a sectional view of the pressure detection device of the first embodiment taken along the line III-III of FIG. 2, and is a sectional view showing a state in which the pressure detection device is held in a casing of an intake pressure measurement apparatus.

FIGS. 1 to 3 show a pressure detection device 10 according to an example embodiment of the disclosure. FIG. 3 shows a part of an intake pressure measurement apparatus 1 in which the pressure detection device 10 is mounted. In the respective drawings, an X1 direction is forward, an X2 direction is backward, a Y1 direction is a right direction, a Y2 direction is a left direction, a Z1 direction is upward, and a Z2 direction is downward.

The intake pressure measurement apparatus 1 shown in FIG. 3 may be attached to an internal combustion engine which may be equipped on a two-wheel vehicle, and a pressure detection device 10 and a throttle position sensor are mounted together in a casing 2. An intake pipe 3 may be formed integrally in the casing 2, and the intake pressure of the internal combustion engine may be applied to the pressure detection device 10 through an intake hole 4 inside the intake pipe 3.

As shown in FIGS. 1 to 3, the pressure detection device 10 may have a housing 11. The housing 11 may be formed of, for example, polyphenylene sulfide (PPS) resin. In the housing 11, three terminal strips 12 and two plate portions 13 may be buried. The terminal strips 12 and the plate portions 13 may be copper plates.

The housing 11, the terminal strips 12, and the plate portions 13 may be integrated by a so-called insert molding method. In this molding method, the terminal strips 12 may be formed at regular intervals in a first hoop material continuous in the Y direction, and the plate portions 13 may be formed at a regular interval in a second hoop material extending in the Y direction in parallel with the first hoop material. The terminal strips 12 and the plate portions 13 may be provided in a cavity of a molding die, PPS molten resin may be injected into the cavity to mold the housing 11, and the housing 11, the terminal strips 12, and the plate portions 13 may be integrated. Thereafter, the terminal strips 12 and the plate portions 13 may be separated from the hoop materials.

As shown in FIG. 1, an outer wall portion 14 which protrudes forward (X1 direction) may be formed integrally in the housing 11. The outer wall portion 14 may be formed in a cylindrical shape, and an internal region of the housing 11 surrounded by the outer wall portion 14 may become a detection space 15. As shown in FIG. 3, in the intake pressure measurement apparatus 1, a printed wiring board 6 may be provided inside the casing 2, the terminal strips 12 of the pressure detection device 10 may be inserted into through holes of the printed wiring board 6, and may be fixed to land portions on the surface of the printed wiring board 6 by solder fillets 7. Then, a front end surface 14a of the outer wall portion 14 may be in close contact with a concave portion 5 in the inner surface of the casing 2, and the intake pressure passing through the intake hole 4 may be applied to the detection space 15.

As shown in FIGS. 1 and 2, an inner wall portion 16 may be formed inside the detection space 15. A front end surface 16a of the inner wall portion 16 is retreated to the backward side (the bottom side of the detection space 15) from the front end surface 14a of the outer wall portion 14. As shown in FIG. 2, the inner wall portion 16 may be curved in a cylindrical shape, and may be configured such that a right end portion 16b thereof is connected to the outer wall portion 14 and a left end portion 16c thereof is continuous to the outer wall portion 14. The inner wall portion 16 may be integrated with the outer wall portion 14 between the right end portion 16b and the left end portion 16c (range α), and the substantial inner wall portion 16 may be limited in a range of β which is a region other than the range α. An angle range in which the inner wall portion 16 is formed, that is, β may be equal to or greater than approximately 180 degrees and equal to or less than approximately 270 degrees.

In the housing 11, a sensor storage portion 17 may be formed to have a concave shape in a region surrounded by the inner wall portion 16. As shown in FIG. 2, the sensor storage portion 17 may have a circular opening shape when viewed from the front. As shown in FIG. 3, a pressure sensor 21 and an IC package 22 embedded with an integrated circuit (ASIC) may be fixed at the bottom of the sensor storage portion 17.

The pressure sensor 21 may have a micro electro mechanical systems (MEMS) structure, and a diaphragm which receives pressure, and a strain detection element, such as a piezoresistive element or a piezoelectric element, which detects deformation of the diaphragm. The integrated circuit in the IC package 22 may be embedded with an amplifier which amplifies the detection output from the pressure sensor 21, a temperature sensor and a temperature compensation circuit based on the temperature measured by the temperature sensor, or the like. Although the pressure sensor 21 and the IC package 22 are wired by wire bonding, in the respective drawings, wire bonding is omitted.

In the sensor storage portion 17, the IC package 22 may be positioned on the upper side (Z1 side), and the pressure sensor 21 may be positioned on the lower side (Z2 side).

In the sensor storage portion 17, the pressure sensor 21 may be disposed at a position close to the inner surface of the inner wall portion 16. In FIG. 2, in the inner surface (an opening edge of the sensor storage portion 17) of the inner wall portion 16, a point P1 to which a center 21a of the pressure sensor 21 is closest is shown, and a center line O connecting the point P1 and the center 21a of the pressure sensor 21 is shown. In the inner surface (an opening edge of the sensor storage portion 17) of the inner wall portion 16, another point P2 passing through the center line O is shown. The ratio (L2/L1) of the opening dimension of the sensor storage portion 17, that is, the distance L1 between the point P1 and the point P2 and the distance L2 between the center 21*a* of the pressure sensor 21 and the point P1 may be equal to or less than approximately $1/3$.

As shown in FIG. 3, the pressure sensor 21 and the IC package 22 fixed at the bottom of the sensor storage portion 17 may be covered with an elastic body 23. The elastic body 23 is a gel-like viscoelastic body, and may be, for example, gel-like silicon resin or fluororesin. The elastic body 23 may be formed by supplying a liquid resin material to a concave portion inside the sensor storage portion 17 and curing the liquid resin material, and thus, a surface 23*a* thereof becomes a concave curved surface.

A power input terminal or an output terminal of the integrated circuit in the IC package 22 may be electrically conducted to the terminal strip 12. As shown in FIG. 3, a part of the terminal strip 12 buried in the housing 11 may be positioned to overlap the rear portion of the sensor storage portion 17. The ratio (L3/L1) of a length L3 in the Z direction of a region where the sensor storage portion 17 and the terminal strip 12 overlap each other and the opening dimension L1 in the Z direction of the sensor storage portion 17 may be equal to or less than approximately $1/2$, and in various embodiments, may be equal to or less than approximately $1/3$. The ratio of the area of the terminal overlapping the sensor storage portion 17 to the opening area of the sensor storage portion 17 may be equal to or less than approximately $1/2$, and in various embodiments, may be equal to or less than approximately $1/3$.

The terminal strip 12 buried in the housing 11 and the pressure sensor 21 do not overlap each other in the front-back direction (X direction).

Inside the detection space 15 of the housing 11, an escape space 18 may be formed in a region other than the sensor storage portion 17. As shown in FIG. 3, the escape space 18 may be formed in an escape concave portion which may be recessed backward from the front end surface 16*a* of the inner wall portion 16 which forms the sensor storage portion 17 (partitions the sensor storage portion 17). As shown in FIG. 2, the escape space 18 may be formed between the outer wall portion 14 and the inner wall portion 16 over a range from the right end portion 16*b* to the left end portion 16*c* in which the inner wall portion 16 and the outer wall portion 14 are connected together.

As shown in FIGS. 1 to 3, when the intake pressure measurement apparatus 1 is provided in an internal combustion engine of a two-wheel vehicle or the like, the pressure detection device 10 may be configured such that the terminal strips 12 are provided upward, and in the detection space 15 surrounded by the outer wall portion 14, the sensor storage portion 17 is positioned on the upper side and the escape space 18 is positioned on the lower side toward gravity from the sensor storage portion 17. For this reason, moisture stuck to the front surface of the sensor storage portion 17 is guided into the escape space 18 through the surface 23*a* of the elastic body 23, whereby it is possible to prevent moisture from applying an unnecessary force to the pressure sensor 21.

In the intake pressure measurement apparatus 1, the intake pressure of the internal combustion engine may be introduced from the intake hole 4 of the casing 2, and the intake pressure may be applied to the detection space 15 of the pressure detection device 10. The intake pressure may be detected by the pressure sensor 21 through the gel-like elastic body 23, and the detection output is electrically processed by the integrated circuit in the IC package 22.

In general, the pressure detection device 10 which is equipped on the intake pressure measurement apparatus 1 may be used under an environment in which change in temperature is extreme. For this reason, thermal stress is likely to act on the housing 11 due to the difference in thermal expansion coefficient between the terminal strips 12 or the plate portions 13 and the housing 11. Stress often acts on the housing 11 by fastening force, vibration, or the like applied from the casing 2 of the intake pressure measurement apparatus 1.

In the pressure detection device 10, the cylindrical outer wall portion 14 may be formed in the housing 11, and a region surrounded by the outer wall portion 14 may become the detection space 15 on which the intake pressure acts. Inside the detection space 15, the inner wall portion 16 whose both end portions 16*b* and 16*c* may be connected to the outer wall portion 14 may be formed integrally, and the sensor storage portion 17 may be formed between the inner wall portion 16 and the outer wall portion 14. The inner wall portion 16 may span the inside of the outer wall portion 14, thereby increasing rigidity of the housing 11.

Since the inner wall portion 16 has a curved shape and a cylindrical shape, stress acting on the bottom of the detection space 15 is dispersed by the inner wall portion 16 having the curved shape, and stress is unlikely to be concentrated near the inner wall portion 16. In particular, since the range β of the inner wall portion 16 having an arc shape is in a range equal to or greater than approximately 180 degrees and equal to or less than approximately 270 degrees, it is possible to form the cylindrical structure of the inner wall portion 16 in a wide range, and stress and strain are easily dispersed by the inner wall portion 16 having the cylindrical structure.

The pressure sensor 21 may be positioned close to the inner wall surface on a concave side of the inner wall portion 16. That is, the pressure sensor 21 may be fixed at a position closer to the inner surface of the inner wall portion 16 than the inner surface of the outer wall portion 14. As shown in FIG. 2, since the ratio (L2/L1) of the distance L2 between the center 21*a* of the pressure sensor 21 and the point P1 to the distance L1 between the point P1 and the point P2 may be equal to or less than approximately $1/3$, even if strain occurs in the housing 11 due to thermal stress or the like, the influence of strain directly on the pressure sensor 21 becomes extremely low.

In the sensor storage portion 17, since the pressure sensor 21 is disposed at a position not overlapping the terminal strip 12, thermal stress due to the difference in thermal expansion coefficient between the housing 11 and the terminal strip 12 is unlikely to act on the pressure sensor 21.

Next, mechanical stress is applied to the housing 11 by fastening force, vibration, or the like applied from the casing 2. The mechanical stress acts from the outer wall portion 14 toward the center of the detection space 15. For this reason, stress is large in the outer peripheral portion close to the outer wall portion 14 and decreases toward the center portion.

Accordingly, in an example embodiment, as shown in FIG. 2, the center 21*a* of the pressure sensor 21 may be disposed in the center portion (the position of the center of the drawing or the center of gravity) of the detection space 15 surrounded by the outer wall portion 14. With this, it is possible to reduce the influence of mechanical stress on the pressure sensor 21.

Although the pressure sensor 21 may be configured such that strain applied to the diaphragm by the pressure is detected by the piezoelectric element or the like and the pressure value is measured, since the pressure sensor 21 may be disposed at a place unlikely to be affected by stress generated in the housing 11, it becomes easy to prevent strain other than change in pressure to be measured from being applied to the diaphragm of the pressure sensor 21.

Figure 5:
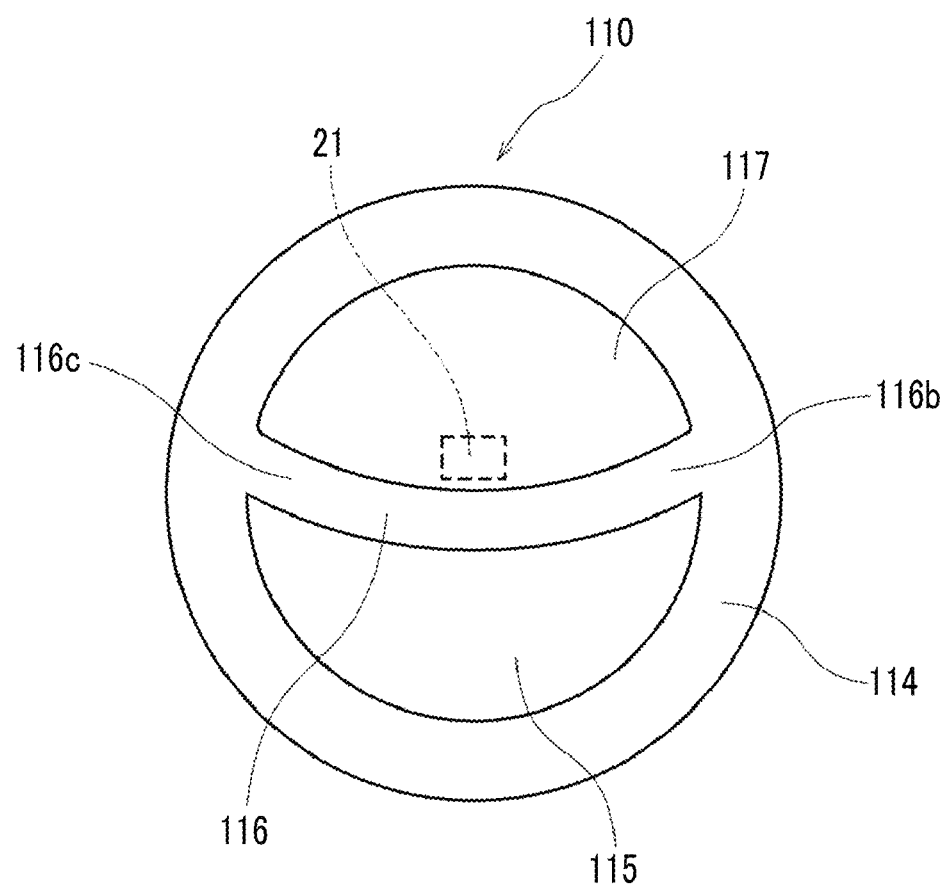
FIG. 5 is a front view of a pressure detection device according to a second embodiment of the invention.

FIG. 5 illustrates the shapes of an outer wall portion 114 and an inner wall portion 116 of a housing which is used in a pressure detection device 110 according to an example embodiment of the disclosure.

The pressure detection device 110 may be configured such that the outer wall portion 114 has a cylindrical shape, and the inner wall portion 116 is provided inside a detection space 115 surrounded by the outer wall portion 114 to substantially bisect the area of the detection space 115. The inner wall portion 116 has a right end portion 116b and a left end portion 116c connected integrally to the outer wall portion 114. A sensor storage portion 117 may be formed in a region surrounded by the inner wall portion 116 and the outer wall portion 114.

The inner wall portion 116 has a curved shape, and the pressure sensor 21 may be fixed close to the inner surface on a concave side of the inner wall portion 116.

In the pressure detection device 110 shown in FIG. 5, strain by, for example, thermal stress is unlikely to act on the pressure sensor 21, and it becomes easy to prevent noise due to strain by stress from being superimposed on the pressure value to be measured.

Figure 6:
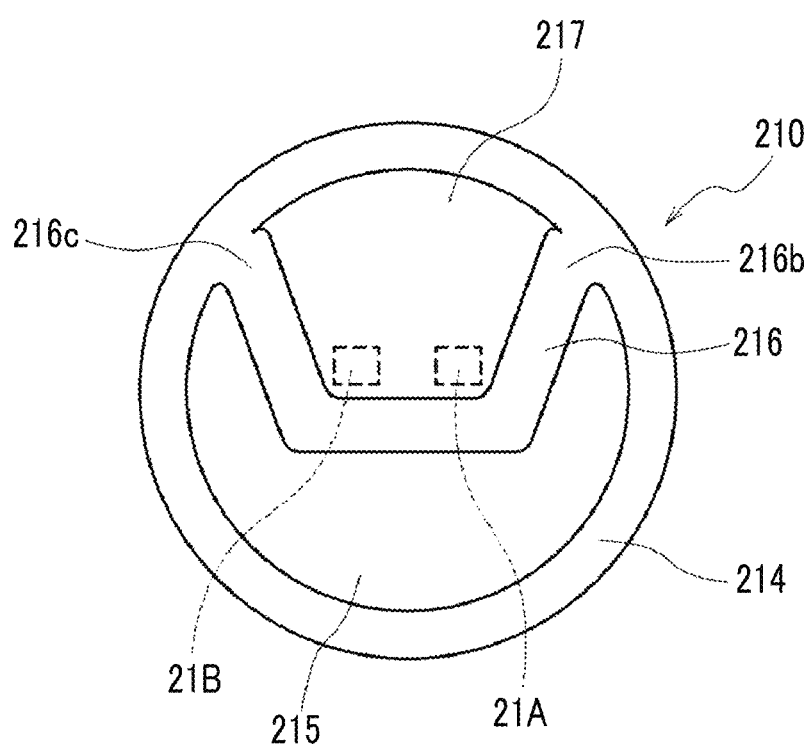
FIG. 6 is a front view of a pressure detection device according to a third embodiment of the invention.

A pressure detection device 210 of an example embodiment shown in FIG. 6 may have an outer wall portion 214, a detection space 215 surrounded by the outer wall portion 214, an inner wall portion 216 having both end portions 216b and 216c connected to the outer wall portion 214, and a sensor storage portion 217 surrounded by the inner wall portion 216.

The inner wall portion 216 may have a shape having linear portions and corner portions, and a pressure sensor 21 may be disposed at one or both of places 21A and 21B inside two corner portions of the inner wall portion 216.

Mechanical stress or thermal stress applied to the housing is likely to be concentrated on the center portion of the linear portion of the inner wall portion 216 and is unlikely to be concentrated on the corner portion. For this reason, the pressure sensor 21 may be disposed inside the corner portion, whereby stress is unlikely to act on the pressure sensor 21.

Figure 7:
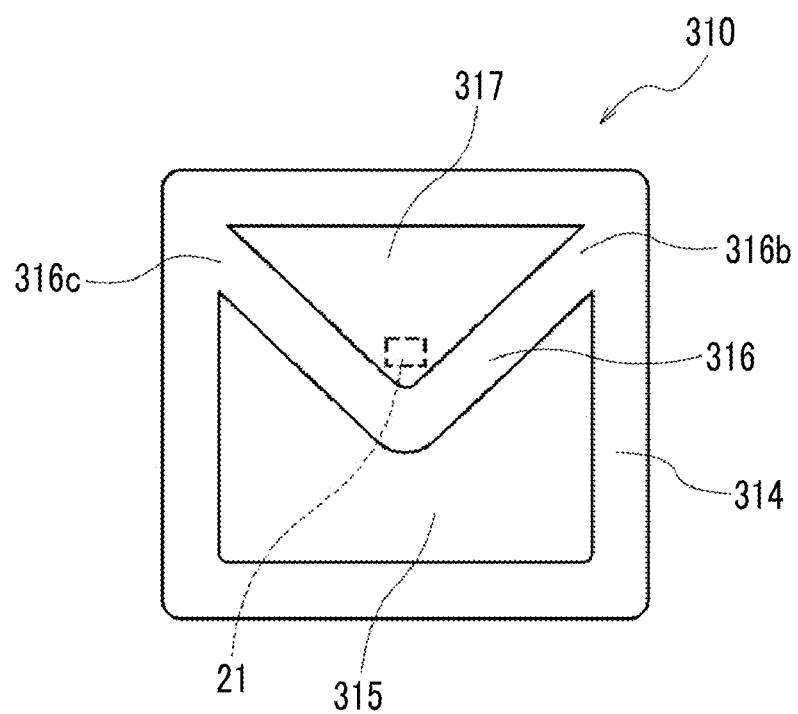
FIG. 7 is a front view of a pressure detection device according to a fourth embodiment of the invention.

A pressure detection device 310 of an example embodiment shown in FIG. 7 may have a rectangular outer wall portion 314 and a rectangular detection space 315 surrounded by the rectangular outer wall portion 314. In each embodiment, the outer wall portion may have a rectangular shape. In FIG. 7, a sensor storage portion 317 may be formed by an inner wall portion 316 whose both end portions 316b and 316c are connected to the outer wall portion 314.

The inner wall portion 316 may be provided with linear portions and one corner portion, and a pressure sensor 21 may be disposed inside one corner portion.

Figures 4A, 4B:
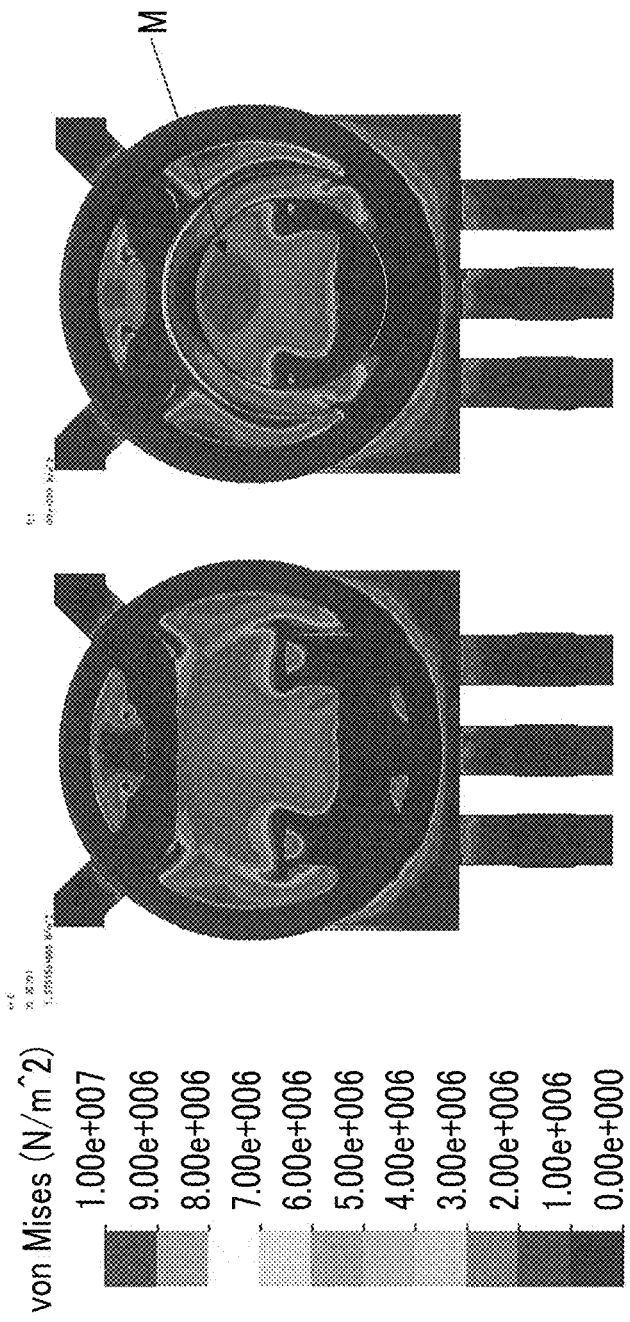
FIGS. 4A and 4B are explanatory views showing the influence of thermal stress in the pressure detection device of the first embodiment.

FIGS. 4A and 4B show a simulation result of thermal stress acting on the housing of the pressure detection device 10.

The configuration of the pressure detection device 10 of an example shown in FIG. 4B includes a housing 11 having the same structure as in the first embodiment shown in FIGS. 1 to 3. FIG. 4A shows a comparative example, and corresponds to a configuration in which the inner wall portion 16 is removed from the housing 11 of the pressure detection device 10 of the first embodiment.

In a simulation, the material of the housing 11 is PPS, and the materials of the terminal strips 12 and the plate portions 13 are copper plates. When the front end surface 14a of the outer wall portion 14 of the housing 11 is fixed, that is, the shape of the front end surface 14a is unchanged, and the temperature increases from 0° C. to 100° C., the concentration state of thermal stress in each portion of the housing 11 is analyzed.

According to the simulation, in the comparative example shown in FIG. 4A, comparatively large thermal stress is distributed at the bottom inside the detection region surrounded by the outer wall portion 14. In contrast, in the example shown in FIG. 4B, it can be confirmed that thermal stress in a portion close to the inner wall portion 16 is small, and in particular, a spot at which thermal stress substantially becomes zero is formed in a region M where the pressure sensor 21 is fixed.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A pressure detection device comprising,
   a housing; and
   a pressure sensor held in the housing,
   wherein an outer wall portion surrounding a detection space and an inner wall portion inside the detection space are formed integrally in the housing, the inner wall portion has both end portions integrally connected to the outer wall portion inside the detection space, the pressure sensor is disposed close to the inner wall portion and separated from the inner surface of the inner wall portion, and the pressure sensor is fixed at a position closer to the inner surface of the inner wall portion than the inner surface of the outer wall portion in the detection space.

2. The pressure detection device according to claim 1,
   wherein the inner wall portion has a curved shape, and the pressure sensor is disposed close to the inner surface on a concave side of the inner wall portion.

3. The pressure detection device according to claim 2,
   wherein the outer wall portion has a cylindrical shape, and the inner wall portion has an arc shape constituting a part of the cylinder.

4. The pressure detection device according to claim 3, wherein the inner wall portion is formed in an angle range equal to or greater than approximately 180 degrees.

5. The pressure detection device according to claim 1, wherein the inner wall portion has a shape having a linear portion and a corner portion, and the pressure sensor is fixed inside the corner portion.

6. The pressure detection device according to claim 1, wherein, on a center line O passing through the inner surface of the inner wall portion, to which the pressure sensor is closest, and the center of the pressure sensor, the ratio (L2/L1) of the distance L2 from the center of the pressure sensor to the inner surface of the inner wall portion and the distance L1 from the inner surface of the inner wall portion and the inner surface of the outer wall portion with the pressure sensor sandwiched therebetween is equal to or less than approximately ⅓.

7. The pressure detection device according to claim 1, wherein the housing is formed of a synthetic resin material, a terminal strip is buried in the housing, and the pressure sensor is disposed at a position not overlapping the terminal strip.

8. The pressure detection device according to claim 1, wherein the pressure sensor is disposed in the center portion of the detection space surrounded by the outer wall portion.

9. An intake pressure measurement apparatus, wherein a casing configured to hold the pressure detection device according to claim 1 is provided, and an intake hole configured to introduce an intake pressure of an internal combustion engine to the detection space is formed in the casing.

10. The pressure detection device according to claim 1, further comprising a sensor storage portion that is surrounded by the inner wall portion and the outer wall portion to be open in the same direction as that of the detection space.

11. The pressure detection device according to claim 10, wherein a center of the sensor storage portion is more inclined to the outer wall portion than a center of the detection space.

* * * * *